United States Patent
Leather et al.

(10) Patent No.: US 8,959,319 B2
(45) Date of Patent: Feb. 17, 2015

(54) EXECUTING FIRST INSTRUCTIONS FOR SMALLER SET OF SIMD THREADS DIVERGING UPON CONDITIONAL BRANCH INSTRUCTION

(75) Inventors: Mark Leather, Los Gatos, CA (US); Norman Rubin, Cambridge, MA (US); Brian D. Emberling, San Mateo, CA (US); Michael Mantor, Orlando, FL (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 470 days.

(21) Appl. No.: 13/310,221

(22) Filed: Dec. 2, 2011

(65) Prior Publication Data

US 2012/0204014 A1  Aug. 9, 2012

Related U.S. Application Data

(60) Provisional application No. 61/422,456, filed on Dec. 13, 2010.

(51) Int. Cl.
*G06F 15/80* (2006.01)
*G06F 9/30* (2006.01)
*G06F 9/38* (2006.01)

(52) U.S. Cl.
CPC .......... *G06F 9/30072* (2013.01); *G06F 9/3851* (2013.01); *G06F 9/3887* (2013.01)
USPC ............ 712/234; 712/22; 712/233; 712/235; 712/E9.053; 712/E9.05

(58) Field of Classification Search
CPC ....... G06F 9/3009; G06F 9/38; G06F 9/3885; G06F 9/30072; G06F 9/3887; G06F 9/30058; G06F 9/3005
See application file for complete search history.

(56) References Cited

U.S. PATENT DOCUMENTS

| 7,353,369 B1 * | 4/2008 | Coon et al. ................... 712/234 |
| 7,447,873 B1 * | 11/2008 | Nordquist ........................ 712/22 |
| 2012/0144376 A1 * | 6/2012 | Van Eijndhoven et al. ... 717/146 |

* cited by examiner

*Primary Examiner* — Kenneth Kim
(74) *Attorney, Agent, or Firm* — Volpe and Koenig, P.C.

(57) ABSTRACT

Embodiments of the present invention provide systems, methods, and computer program products for improving divergent conditional branches in code being executed by a processor. For example, in an embodiment, a method comprises detecting a conditional statement of a program being simultaneously executed by a plurality of threads, determining which threads evaluate a condition of the conditional statement as true and which threads evaluate the condition as false, pushing an identifier associated with the larger set of the threads onto a stack, executing code associated with a smaller set of the threads, and executing code associated with the larger set of the threads.

20 Claims, 5 Drawing Sheets

EXECUTING FIRST INSTRUCTIONS FOR SMALLER SET OF SIMD THREADS DIVERGING UPON CONDITIONAL BRANCH INSTRUCTION

CROSS REFERENCE TO RELATED APPLICATIONS

This application claims the benefit of U.S. Provisional Application. No. 61/422,456, filed on Dec. 13, 2010, which is incorporated herein by reference in its entirety.

BACKGROUND OF THE INVENTION

1. Field of the Invention

The present invention is generally directed to computing systems. More particularly, the present invention is directed to improving the execution of code by a processor.

2. Background Art

The desire to use a graphics processing unit (GPU) for general computation has become much more pronounced recently due to the GPU's exemplary performance per unit power and/or cost. The computational capabilities for GPUs, generally, have grown at a rate exceeding that of the corresponding central processing unit (CPU) platforms. This growth, coupled with the explosion of the mobile computing market (e.g., notebooks, mobile smart phones, tablets, etc.) and its necessary supporting server/enterprise systems, has been used to provide a specified quality of desired user experience. Consequently, the combined use of CPUs and GPUs for executing workloads with data parallel content is becoming a volume technology.

However, GPUs have traditionally operated in a constrained programming environment, available primarily for the acceleration of graphics. These constraints arose from the fact that GPUs did not have as rich a programming ecosystem as CPUs. Their use, therefore, has been mostly limited to two dimensional (2D) and three dimensional (3D) graphics and a few leading edge multimedia applications, which are already accustomed to dealing with graphics and video application programming interfaces (APIs).

With the advent of multi-vendor supported OpenCL® and DirectCompute®, standard APIs and supporting tools, the limitations of the GPUs in traditional applications has been extended beyond traditional graphics. Although OpenCL and DirectCompute are a promising start, there are many hurdles remaining to creating an environment and ecosystem that allows the combination of a CPU and a GPU to be used as fluidly as the CPU for most programming tasks.

Existing computing systems often include multiple processing devices. For example, some computing systems include both a CPU and a GPU on separate chips (e.g., the CPU might be located on a motherboard and the GPU might be located on a graphics card) or in a single chip package. Both of these arrangements, however, still include significant challenges associated with (i) separate memory systems, (ii) efficient scheduling, (iii) programming model, (iv) compiling to multiple target instruction set architectures, and (v) providing quality of service (QoS) guarantees between processes, (ISAs)—all while minimizing power consumption.

For example, since processes cannot be efficiently identified and/or preempted in existing computing systems, a rogue process can occupy the GPU hardware for arbitrary amounts of time. This diminishes the user's QoS.

In other cases, the ability to context switch off of the hardware is severely constrained—occurring at very coarse granularity and only at a very limited set of points in a program's execution. This constraint exists because saving the necessary architectural and microarchitectural states for restoring and resuming a process is not supported. Lack of support for precise exceptions prevents a faulted job from being context switched out and restored at a later point, resulting in lower hardware usage as the faulted threads occupy hardware resources and which sit idle during fault handling.

In another example, computational inefficiencies can arise in existing computing systems when each thread in a wavefront, executing the same program on a GPU, encounters conditional code, as some threads may evaluate the condition as true, while others may evaluate the condition as false. When conditional sections of code become more complex or include loops with different iteration counts per thread, the threads in the wavefront diverge and may never reconverge, which can cause significant performance loss. In a worst case scenario, for example, a processor may execute only one thread at a time instead of a full wavefront. Thus, if the wavefront includes 64 threads, the processor can operate at only 1/64 of peak performance.

Other attempts at addressing this problem have been prohibitively expensive, computationally inefficient, and/or overly complex.

SUMMARY OF EMBODIMENTS

What is needed, therefore, are systems, methods, and computer program products for improving divergent conditional branches in code simultaneously executed by threads in a more efficient manner.

Although GPUs, accelerated processing units (APUs), and general purpose use of the graphics processing unit (GPGPU) are commonly used terms in this field, the expression "accelerated processing device (APD)" is considered to be a broader expression. For example, APD refers to any cooperating collection of hardware and/or software that performs those functions and computations associated with accelerating graphics processing tasks, data parallel tasks, or nested data parallel tasks in an accelerated manner compared to conventional CPUs, conventional GPUs, software and/or combinations thereof.

Embodiments of the present invention provide systems, methods, and computer program products for improving divergent conditional branches in code being executed by a processor. For example, a method includes detecting a conditional statement of a program being simultaneously executed by a plurality of threads, determining which threads evaluate a condition of the conditional statement as true and which threads evaluate the condition as false, pushing an identifier associated with the larger set of the threads onto a stack, executing code associated with a smaller set of the threads, and executing code associated with the larger set of the threads.

Additional features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention. Various embodiments of the present invention are described below with reference to the drawings, wherein like reference numerals are used to refer to like elements throughout.

Figure 1A:
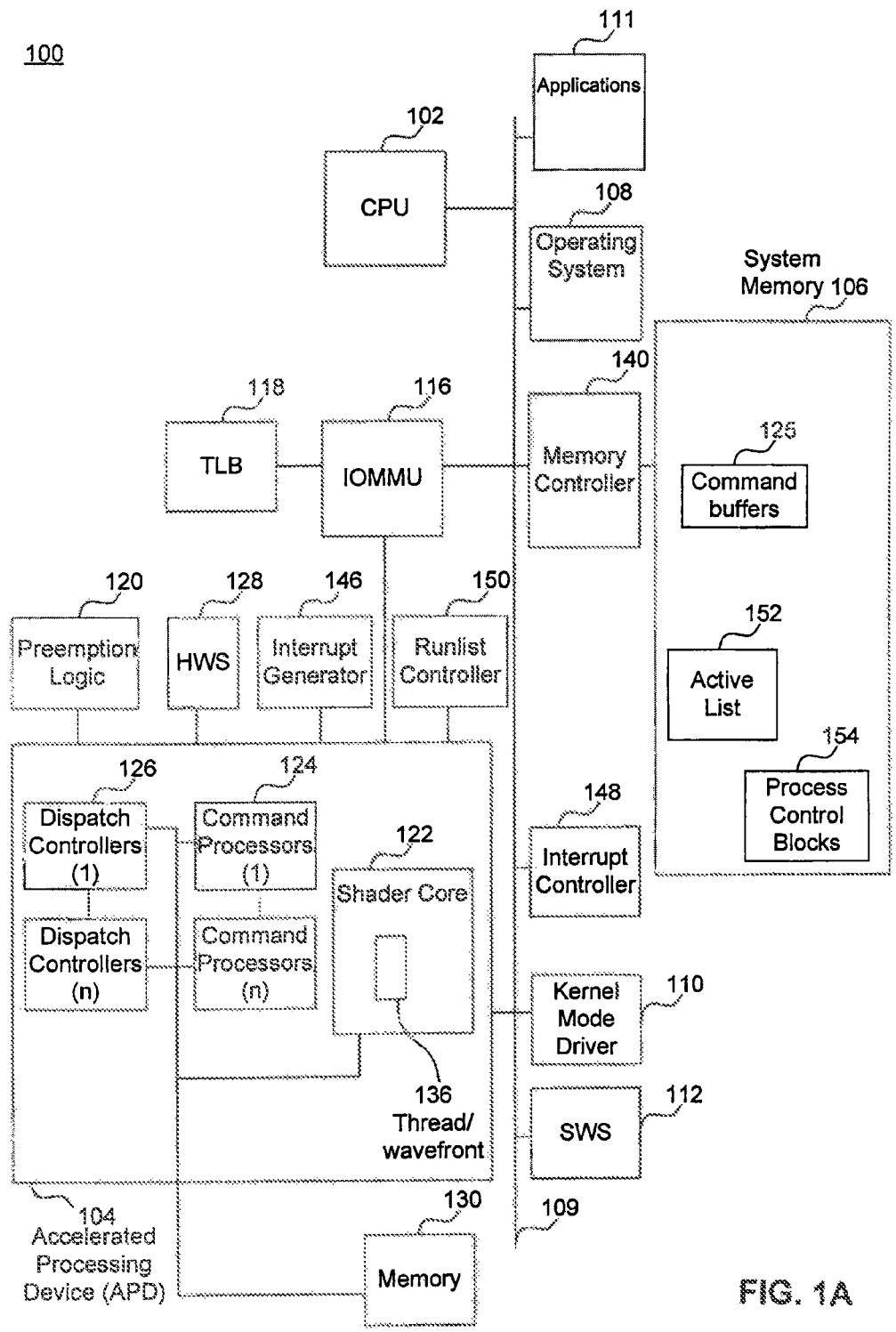
FIG. 1A is an illustrative block diagram of a processing system in accordance with embodiments of the present invention.

Features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments of the invention" does not require that all embodiments of the invention include the discussed feature, advantage or mode of operation. Alternate embodiments may be devised without departing from the scope of the invention, and well-known elements of the invention may not be described in detail or may be omitted so as not to obscure the relevant details of the invention. In addition, the terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

FIG. 1A is an exemplary illustration of a unified computing system 100 including two processors, a CPU 102 and an APD 104. CPU 102 can include one or more single or multi core CPUs. In one embodiment of the present invention, the system 100 is formed on a single silicon die or package, combining CPU 102 and APD 104 to provide a unified programming and execution environment. This environment enables the APD 104 to be used as fluidly as the CPU 102 for some programming tasks. However, it is not an absolute requirement of this invention that the CPU 102 and APD 104 be formed on a single silicon die. In some embodiments, it is possible for them to be formed separately and mounted on the same or different substrates.

In one example, system 100 also includes a memory 106, an operating system 108, and a communication infrastructure 109. The operating system 108 and the communication infrastructure 109 are discussed in greater detail below.

The system 100 also includes a kernel mode driver (KMD) 110, a software scheduler (SWS) 112, and a memory management unit 116, such as input/output memory management unit (IOMMU). Components of system 100 can be implemented as hardware, firmware, software, or any combination thereof. A person of ordinary skill in the art will appreciate that system 100 may include one or more software, hardware, and firmware components in addition to, or different from, that shown in the embodiment shown in FIG. 1A.

In one example, a driver, such as KMD 110, typically communicates with a device through a computer bus or communications subsystem to which the hardware connects. When a calling program invokes a routine in the driver, the driver issues commands to the device. Once the device sends data back to the driver, the driver may invoke routines in the original calling program. In one example, drivers are hardware-dependent and operating-system-specific. They usually provide the interrupt handling required for any necessary asynchronous time-dependent hardware interface.

Device drivers, particularly on modern Microsoft Windows® platforms, can run in kernel-mode (Ring 0) or in user-mode (Ring 3). The primary benefit of running a driver in user mode is improved stability, since a poorly written user mode device driver cannot crash the system by overwriting kernel memory. On the other hand, user/kernel-mode transitions usually impose a considerable performance overhead, thereby prohibiting user mode-drivers for low latency and high throughput requirements. Kernel space can be accessed by user module only through the use of system calls. End user programs like the UNIX shell or other GUI based applications are part of the user space. These applications interact with hardware through kernel supported functions.

CPU 102 can include (not shown) one or more of a control processor, field programmable gate array (FPGA), application specific integrated circuit (ASIC), or digital signal processor (DSP). CPU 102, for example, executes the control logic, including the operating system 108, KMD 110, SWS 112, and applications 111, that control the operation of computing system 100. In this illustrative embodiment, CPU 102, according to one embodiment, initiates and controls the execution of applications 111 by, for example, distributing the processing associated with that application across the CPU 102 and other processing resources, such as the APD 104.

APD 104, among other things, executes commands and programs for selected functions, such as graphics operations and other operations that may be, for example, particularly suited for parallel processing. In general, APD 104 can be frequently used for executing graphics pipeline operations, such as pixel operations, geometric computations, and rendering an image to a display. In various embodiments of the present invention, APD 104 can also execute compute processing operations (e.g., those operations unrelated to graphics such as, for example, video operations, physics simulations, computational fluid dynamics, etc.), based on commands or instructions received from CPU 102.

For example, commands can be considered as special instructions that are not typically defined in the instruction set architecture (ISA). A command may be executed by a special processor such a dispatch processor, command processor, or network controller. On the other hand, instructions can be considered, for example, a single operation of a processor within a computer architecture. In one example, when using two sets of ISAs, some instructions are used to execute x86 programs and some instructions are used to execute kernels on an APD compute unit.

In an illustrative embodiment, CPU 102 transmits selected commands to APD 104. These selected commands can include graphics commands and other commands amenable to parallel execution. These selected commands, that can also include compute processing commands, can be executed substantially independently from CPU 102.

APD 104 can include its own compute units (not shown), such as, but not limited to, one or more SIMD processing cores. As referred to herein, a SIMD is a pipeline, or programming model, where a kernel is executed concurrently on multiple processing elements each with its own data and a shared program counter. All processing elements execute an identical set of instructions. The use of predication enables work-items to participate or not for each issued command.

In one example, each APD 104 compute unit can include one or more scalar and/or vector floating-point units and/or arithmetic and logic units (ALUs). The APD compute unit can also include special purpose processing units (not shown), such as inverse-square root units and sine/cosine units. In one example, the APD compute units are referred to herein collectively as shader core 122.

Having one or more SIMDs, in general, makes APD 104 ideally suited for execution of data-parallel tasks such as those that are common in graphics processing.

Some graphics pipeline operations, such as pixel processing, and other parallel computation operations, can require that the same command stream or compute kernel be performed on streams or collections of input data elements. Respective instantiations of the same compute kernel can be executed concurrently on multiple compute units in shader core 122 in order to process such data elements in parallel. As referred to herein, for example, a compute kernel is a function containing instructions declared in a program and executed on an APD compute unit. This function is also referred to as a kernel, a shader, a shader program, or a program.

In one illustrative embodiment, each compute unit (e.g., SIMD processing core) can execute a respective instantiation of a particular work-item to process incoming data. A work-item is one of a collection is of parallel executions of a kernel invoked on a device by a command. A work-item can be executed by one or more processing elements as part of a work-group executing on a compute unit.

A work-item is distinguished from other executions within the collection by its global ID and local ID. In one example, a subset of work-items in a workgroup that execute simultaneously together on a SIMD can be referred to as a wavefront 136. The width of a wavefront is a characteristic of the hardware of the compute unit (e.g., SIMD processing core). As referred to herein, a workgroup is a collection of related work-items that execute on a single compute unit. The work-items in the group execute the same kernel and share local memory and work-group barriers.

In the exemplary embodiment, all wavefronts from a workgroup are processed on the same SIMD processing core. Instructions across a wavefront are issued one at a time, and when all work-items follow the same control flow, each work-item executes the same program. Wavefronts can also be referred to as warps, vectors, or threads.

An execution mask and work-item predication are used to enable divergent control flow within a wavefront, where each individual work-item can actually take a unique code path through the kernel. Partially populated wavefronts can be processed when a full set of work-items is not available at wavefront start time. For example, shader core 122 can simultaneously execute a predetermined number of wavefronts 136, each wavefront 136 comprising a multiple work-items.

Within the system 100, APD 104 includes its own memory, such as graphics memory 130 (although memory 130 is not limited to graphics only use). Graphics memory 130 provides a local memory for use during computations in APD 104. Individual compute units (not shown) within shader core 122 can have their own local data store (not shown). In one embodiment, APD 104 includes access to local graphics memory 130, as well as access to the memory 106. In another embodiment, APD 104 can include access to dynamic random access memory (DRAM) or other such memories (not shown) attached directly to the APD 104 and separately from memory 106.

In the example shown. APD 104 also includes one or "n" number of command processors (CPs) 124. CP 124 controls the processing within APD 104. CP 124 also retrieves commands to be executed from command buffers 125 in memory 106 and coordinates the execution of those commands on APD 104.

In one example, CPU 102 inputs commands based on applications 111 into appropriate command buffers 125. As referred to herein, an application is the combination of the program parts that will execute on the compute units within the CPU and APD.

A plurality of command buffers 125 can be maintained with each process scheduled for execution on the APD 104.

CP 124 can be implemented in hardware, firmware, or software, or a combination thereof. In one embodiment, CP 124 is implemented as a reduced instruction set computer (RISC) engine with microcode for implementing logic including scheduling logic.

APD 104 also includes one or "n" number of dispatch controllers (DCs) 126. In the present application, the term dispatch refers to a command executed by a dispatch controller that uses the context state to initiate the start of the execution of a kernel for a set of work groups on a set of compute units. DC 126 includes logic to initiate workgroups in the shader core 122. In some embodiments, DC 126 can be implemented as part of CP 124.

System 100 also includes a hardware scheduler (HWS) 128 for selecting a process from a run list 150 for execution on APD 104. HWS 128 can select processes from run list 150 using round robin methodology, priority level, or based on other scheduling policies. The priority level, for example, can be dynamically determined. HWS 128 can also include functionality to manage the run list 150, for example, by adding new processes and by deleting existing processes from run-list 150. The run list management logic of HWS 128 is sometimes referred to as a run list controller (RLC).

In various embodiments of the present invention, when HWS 128 initiates the execution of a process from run list 150, CP 124 begins retrieving and executing commands from the corresponding command buffer 125. In some instances, CP 124 can generate one or more commands to be executed within APD 104, which correspond with commands received from CPU 102. In one embodiment, CP 124, together with other components, implements a prioritizing and scheduling of commands on APD 104 in a manner that improves or maximizes the utilization of the resources of APD 104 resources and/or system 100.

APD 104 can have access to, or may include, an interrupt generator 146. Interrupt generator 146 can be configured by APD 104 to interrupt the operating system 108 when interrupt events, such as page faults, are encountered by APD 104. For example, APD 104 can rely on interrupt generation logic within IOMMU 116 to create the page fault interrupts noted above.

APD 104 can also include preemption and context switch logic 120 for preempting a process currently running within shader core 122. Context switch logic 120, for example, includes functionality to stop the process and save its current state (e.g., shader core 122 state, and CP 124 state).

As referred to herein, the term state can include an initial state, an intermediate state, and/or a final state. An initial state is a starting point for a machine to process an input data set according to a programming order to create an output set of data. There is an intermediate state, for example, that needs to be stored at several points to enable the processing to make forward progress. This intermediate state is sometimes stored to allow a continuation of execution at a later time when interrupted by some other process. There is also final state that can be recorded as part of the output data set Preemption and context switch logic 120 can also include logic to context switch another process into the APD 104. The functionality to context switch another process into running on the APD 104 may include instantiating the process, for example, through the CP 124 and DC 126 to run on APD 104, restoring any previously saved state for that process, and starting its execution.

Memory 106 can include non-persistent memory such as DRAM (not shown). Memory 106 can store, e.g., processing logic instructions, constant values, and variable values during execution of portions of applications or other processing logic. For example, in one embodiment, parts of control logic to perform one or more operations on CPU 102 can reside within memory 106 during execution of the respective portions of the operation by CPU 102.

During execution, respective applications, operating system functions, processing logic commands, and system software can reside in memory 106. Control logic commands fundamental to operating system 108 will generally reside in memory 106 during execution. Other software commands, including, for example, kernel mode driver 110 and software scheduler 112 can also reside in memory 106 during execution of system 100.

In this example, memory 106 includes command buffers 125 that are used by CPU 102 to send commands to APD 104. Memory 106 also contains process lists and process information (e.g., active list 152 and process control blocks 154). These lists, as well as the information, are used by scheduling software executing on CPU 102 to communicate scheduling information to APD 104 and/or related scheduling hardware. Access to memory 106 can be managed by a memory controller 140, which is coupled to memory 106. For example, requests from CPU 102, or from other devices, for reading from or for writing to memory 106 are managed by the memory controller 140.

Referring back to other aspects of system 100, IOMMU 116 is a multi-context memory management unit.

As used herein, context can be considered the environment within which the kernels execute and the domain in which synchronization and memory management is defined. The context includes a set of devices, the memory accessible to those devices, the corresponding memory properties and one or more command-queues used to schedule execution of a kernel(s) or operations on memory objects.

Referring back to the example shown in FIG. 1A, IOMMU 116 includes logic to perform virtual to physical address translation for memory page access for devices including APD 104. IOMMU 116 may also include logic to generate interrupts, for example, when a page access by a device such as APD 104 results in a page fault. IOMMU 116 may also include, or have access to, a translation lookaside buffer (TLB) 118. TLB 118, as an example, can be implemented in a content addressable memory (CAM) to accelerate translation of logical (i.e., virtual) memory addresses to physical memory addresses for requests made by APD 104 for data in memory 106.

In the example shown, communication infrastructure 109 interconnects the components of system 100 as needed. Communication infrastructure 109 can include (not shown) one or more of a peripheral component interconnect (PCI) bus, extended PCI (PCI-E) bus, advanced microcontroller bus architecture (AMBA) bus, advanced graphics port (AGP), or other such communication infrastructure. Communications infrastructure 109 can also include an Ethernet, or similar network, or any suitable physical communications infrastructure that satisfies an application's data transfer rate requirements. Communication infrastructure 109 includes the functionality to interconnect components including components of computing system 100.

In this example, operating system 108 includes functionality to manage the hardware components of system 100 and to provide common services. In various embodiments, operating system 108 can execute on CPU 102 and provide common services. These common services can include, for example, scheduling applications for execution within CPU 102, fault management, interrupt service, as well as processing the input and output of other applications.

In some embodiments, based on interrupts generated by an interrupt controller, such as interrupt controller 148, operating system 108 invokes an appropriate interrupt handling routine. For example, upon detecting a page fault interrupt, operating system 108 may invoke an interrupt handler to initiate loading of the relevant page into memory 106 and to update corresponding page tables.

Operating system 108 may also include functionality to protect system 100 by ensuring that access to hardware components is mediated through operating system managed kernel functionality. In effect, operating system 108 ensures that applications, such as applications 111, run on CPU 102 in user space. Operating system 108 also ensures that applications 111 invoke kernel functionality provided by the operating system to access hardware and/or input/output functionality.

By way of example, applications 111 include various programs or commands to perform user computations that are also executed on CPU 102. CPU 102 can seamlessly send selected commands for processing on the APD 104. In one example, KMD 110 implements an application program interface (API) through which CPU 102, or applications executing on CPU 102 or other logic, can invoke APD 104 functionality. For example, KMD 110 can enqueue commands from CPU 102 to command buffers 125 from which APD 104 will subsequently retrieve the commands. Additionally, KMD 110 can, together with SWS 112, perform scheduling of processes to be executed on APD 104. SWS 112, for example, can include logic to maintain a prioritized list of processes to be executed on the APD.

In other embodiments of the present invention, applications executing on CPU 102 can entirely bypass KMD 110 when enqueuing commands.

In some embodiments, SWS 112 maintains an active list 152 in memory 106 of processes to be executed on APD 104. SWS 112 also selects a subset of the processes in active list 152 to be managed by HWS 128 in the hardware. Information relevant for running each process on APD 104 is communicated from CPU 102 to APD 104 through process control blocks (PCB) 154.

Processing logic for applications, operating system, and system software can include commands specified in a programming language such as C and/or in a hardware description language such as Verilog, RTL, or netlists, to enable ultimately configuring a manufacturing process through the generation of maskworks/photomasks to generate a hardware device embodying aspects of the invention described herein.

A person of skill in the art will understand, upon reading this description, that computing system 100 can include more or fewer components than shown in FIG. 1A. For example, computing system 100 can include one or more input interfaces, non-volatile storage, one or more output interfaces, network interfaces, and one or more displays or display interfaces.

Figure 1B:
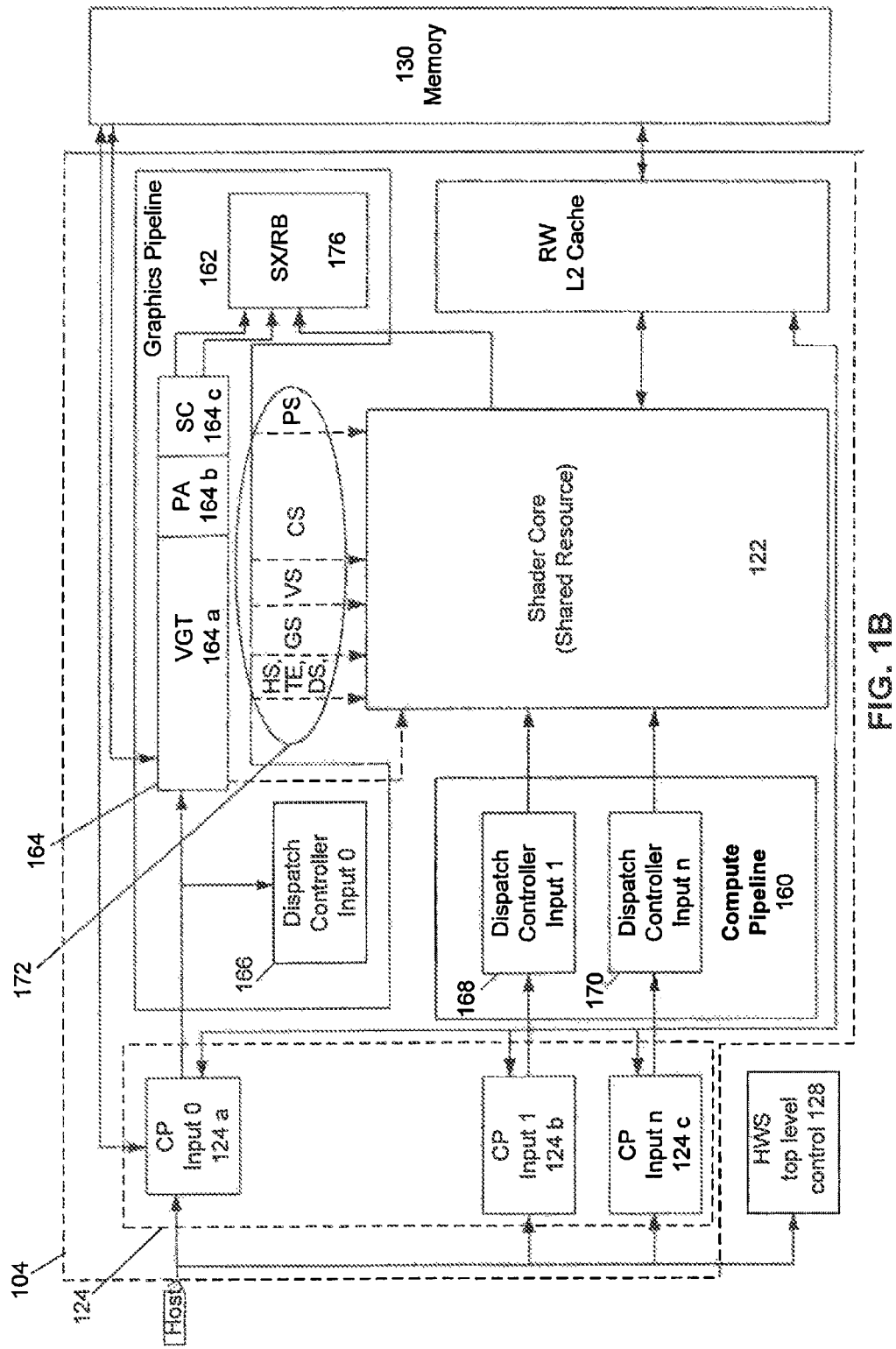
FIG. 1B is an illustrative block diagram illustration of the APD illustrated in FIG. 1A.

FIG. 1B is an embodiment showing a more detailed illustration of APD 104 shown in FIG. 1A. In FIG. 1B, CP 124 can include CP pipelines 124a, 124b, and 124c. CP 124 can be configured to process the command lists that are provided as inputs from command buffers 125, shown in FIG. 1A. In the exemplary operation of FIG. 1B, CP input 0 (124a) is responsible for driving commands into a graphics pipeline 162. CP inputs 1 and 2 (124b and 124c) forward commands to a compute pipeline 160. Also provided is a controller mechanism 166 for controlling operation of HWS 128.

In FIG. 1B, graphics pipeline 162 can include a set of blocks, referred to herein as ordered pipeline 164. As an example, ordered pipeline 164 includes a vertex group translator (VGT) 164a, a primitive assembler (PA) 164b, a scan converter (SC) 164c, and a shader-export, render-back unit (SX/RB) 176. Each block within ordered pipeline 164 may represent a different stage of graphics processing within graphics pipeline 162. Ordered pipeline 164 can be a fixed function hardware pipeline. Other implementations can be used that would also be within the spirit and scope of the present invention.

Although only a small amount of data may be provided as an input to graphics pipeline 162, this data will be amplified by the time it is provided as an output from graphics pipeline 162. Graphics pipeline 162 also includes DC 166 for counting through ranges within work-item groups received from CP pipeline 124a. Compute work submitted through DC 166 is semi-synchronous with graphics pipeline 162.

Compute pipeline 160 includes shader DCs 168 and 170. Each of the DCs 168 and 170 is configured to count through compute ranges within work groups received from CP pipelines 124b and 124c.

The DCs 166, 168, and 170, illustrated in FIG. 1B, receive the input ranges, break the ranges down into workgroups, and then forward the workgroups to shader core 122.

Since graphics pipeline 162 is generally a fixed function pipeline, it is difficult to save and restore its state, and as a result, the graphics pipeline 162 is difficult to context switch. Therefore, in most cases context switching, as discussed herein, does not pertain to context switching among graphics processes. An exception is for graphics work in shader core 122, which can be context switched.

After the processing of work within graphics pipeline 162 has been completed, the completed work is processed through a render back unit 176, which does depth and color calculations, and then writes its final results to memory 130. Shader core 122 can be shared by graphics pipeline 162 and compute pipeline 160. Shader core 122 can be a general processor configured to run wavefronts. In one example, all work within compute pipeline 160 is processed within shader core 122. Shader core 122 runs programmable software code and includes various forms of data, such as state data.

Improving Divergent Conditional Branches

Systems, methods, and computer program products are disclosed herein for improving divergent conditional branches in a SIMD processor. For example, methods disclosed herein efficiently handle arbitrarily complex conditional branch (CBR) graphs in a SIMD or vector processor (for example, a SIMD processing core in APD 104). However, it should be understood that embodiments of the present invention are applicable to any processing device simultaneously executing several threads including any type of conditional code.

In an embodiment, shader core 122 simultaneously executes a number of wavefronts 136, each wavefront 136 comprising a number of threads executing the same program. Code in each wavefront may include conditional code with conditional branches. In an embodiment, conditional branches in a SIMD processor are implemented using predication to enable only a subset of the SIMD processor's threads to execute the conditional code. However, when conditional sections of code become more complex or include loops with different iteration counts per thread, the threads in the wavefront diverge (e.g., the threads in the wavefront do not simultaneously execute the same instruction) and may never reconverge, which can cause significant performance loss.

For example, when all threads in a wavefront execute the same instruction, only one dock cycle in needed to process the instruction for all threads in the wavefront. However, if the threads in the wavefront are not concurrently executing the same instruction, multiple clock cycles are needed, leading to significant inefficiencies. In a worst case scenario, the SIMD processor may execute only one thread at a time instead of a full wavefront. Thus, if the wavefront includes 64 threads, the SIMD processor will operate at 1/64 of peak performance. Therefore, it is computationally advantageous to concurrently execute as many threads as possible.

In accordance with an embodiment of the present invention, new instructions and state bits are provided to enable the compiler to denote fork (diverge) and join (reconverge) points within the shader program (for example, by inserting specialized "fork" and "join" instructions). In between these fork and join instructions, the shader code may include any amount of dynamic branching, looping, or other program control flow. Accordingly, the SIMD processor maintains better performance with arbitrarily complex conditional branch graphs. Embodiments of the present invention enable the SIMD processor to maximize the number of simultaneously executed threads, leading to a dramatic increase in processing efficiency and performance. Embodiments of the present invention provide the ability to support thread reconvergence simply and with very little cost (e.g., in an embodiment, about 0.047 bits per thread (about 3 bits per wave)).

In an embodiment of the present invention, a program to be simultaneously executed by the threads in the wavefront is parsed, and a compiler builds a graph of the program. In an embodiment, a program counter is stored for each thread in the wavefront. When a conditional branch is reached, a determination is made which set of threads evaluate the condition as true and which set of threads evaluate the condition as false. In an embodiment, the larger set of threads is pushed onto a stack for later execution, and the smaller set of threads is executed.

In another embodiment, the threads themselves are not pushed onto a stack, but rather an identifier associated with the threads (such as a mask and/or program counter) is pushed onto the stack. For example, in an embodiment, the mask contains information regarding which of the threads evaluate the condition as true, and which threads evaluate the condition as false. One set of threads is thus masked off, and the other set of threads is executed. It should further be understood that any other data structure (for example, a linked list or an array) may be used for storing threads to be executed at a later time.

Figure 2:
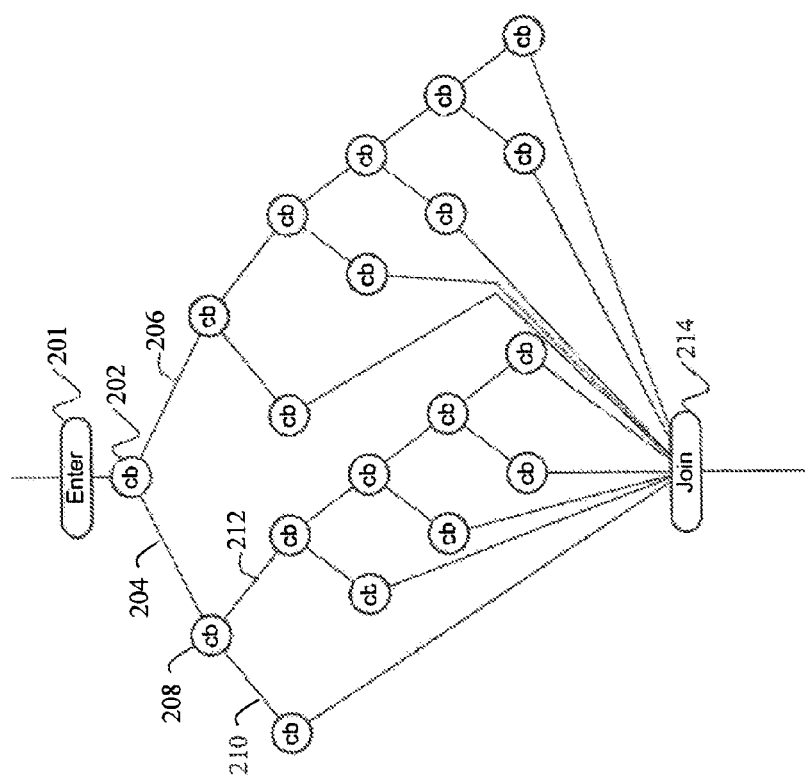
FIG. 2 is a diagram illustrating conditional branches in a block of code.

FIG. 2 is a diagram 200 illustrating conditional branches in a block of code. FIG. 2 shows "Enter" 201 and "Join" 214 points in a block of conditional code. In an embodiment, the compiler adds these instructions to the shader program to denote fork and join points. In an embodiment, Enter/Join blocks may be hierarchically nested to any depth and may coexist with other methods for managing conditional flow control and/or computed jumps.

Each conditional statement in the block of code is represented by "cb" in FIG. 2 (e.g., conditional statements 202 and 208). When condition 202 is reached, a determination is made as to which threads evaluate condition 202 as true 204 and which threads evaluate condition 202 as false 206. If the number of threads evaluating condition 202 as false 206 is larger than the number of threads evaluating condition 202 as true 204, the threads evaluating the condition as false 206 may be masked off, and the threads evaluating the condition as true 204 may be executed.

It should be noted that the smaller set of threads may include code containing additional conditional statements (e.g., 208) with additional branches (e.g., 210 and 212). In each case, an identifier representing the larger set of threads is pushed onto the stack, and the smaller set of threads is executed. This process continues until the join point 214 is reached, at which point all code in the block has finished executing. While the smaller set of threads is executed first in this example, it should be understood that embodiments of the present invention could involve pushing the smaller set of threads onto the stack and executing the larger set of threads. Further, if the two sets of threads are equal in size, either stack may be pushed onto a stack, and the other may be executed. By utilizing the methods disclosed herein, the number of threads simultaneously executing the same code is advantageously maximized in a cheap, simple, and efficient manner.

For example, a block of code being simultaneously executed may include the following segment:

```
if (cond1)
    do A;
else
    do B;
```

In the example above, certain threads in the wavefront may evaluate cond1 as true, and certain threads in the wavefront may evaluate cond1 as false. For example, if a wavefront includes 64 threads, 26 may evaluate cond1 as true, and 38 may evaluate cond1 as false. An identifier representing the 38 threads evaluating cond1 as false is pushed onto the stack, and the 26 threads evaluating cond1 as true are executed. After the 26 threads evaluating cond1 as true have finished executing all code associated with cond1, the 38 threads evaluating cond1 as false are executed. After the 38 threads evaluating cond1 as false have finished executing, a join point is reached, and all 64 threads may be simultaneously executed again (until another conditional statement is reached).

Register space required to store the stack is minimized by pushing identifiers representing the larger set of threads onto the stack and executing the smaller set of threads. This ensures that the stack contains elements identifying no more than half the total amount of threads being executed. By utilizing this method, the maximum depth of the stack may be given by the formula $\log_2$ (N), where N is the number of threads being simultaneously executed, because each branch is a binary decision. For example, if 64 threads are simultaneously executed, the stack will contain at most 6 entries, because $\log_2$ (64) is 6. Thus, for a 64 thread wavefront, at most 6 sets of general purpose registers are needed to hold a temporary branch stack. Additionally, for a 64 thread wavefront, 3 bits of state per wavefront may be used for a conditional branch stack pointer, because the maximum stack depth is 6 entries. In an embodiment, the conditional branch stack pointer may be incremented each time an entry is pushed onto the stack and decremented when an element is removed (popped) from the stack for processing.

Figure 3:
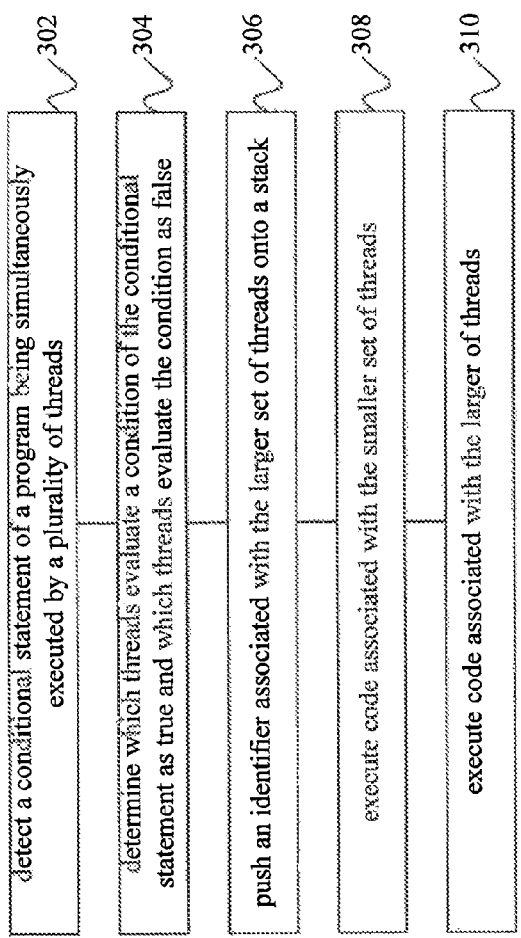
FIG. 3 is a flowchart of a method of improving divergent conditional branches in accordance with an embodiment of the present invention.

A method of improving divergent conditional branches in accordance with an embodiment of the present invention will now be explained with respect to the flowchart 300 of FIG. 3. A conditional statement of a program being simultaneously executed by a plurality of threads is detected in step 302. In step 304, a determination is made regarding which threads evaluate a condition of the conditional statement as true and which threads evaluate the condition as false. In step 306, an identifier associated with the larger set of threads is pushed onto a stack. In step 308, code associated with the smaller set of threads is executed. In step 310, code associated with the larger set of threads is executed. The above process may be repeated for all conditional statements in a block of code until a join point is reached.

Figure 4:
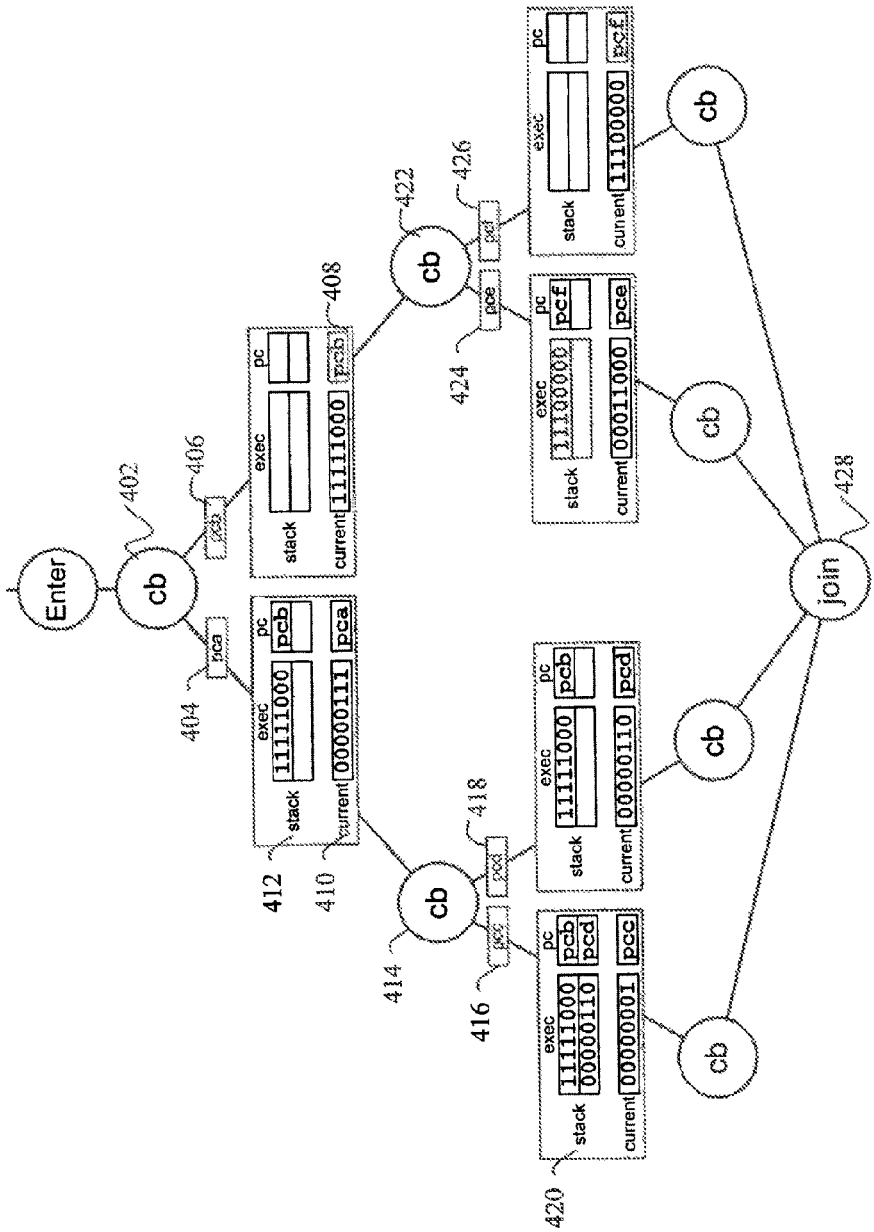
FIG. 4 is a diagram illustrating the order of execution of code associated with conditional branches in accordance with an embodiment of the present invention.

An example illustrating the order of execution of code associated with conditional branches in accordance with an embodiment of the present invention will now be explained with reference to the diagram 400 of FIG. 4. In FIG. 4, the first condition 402 in the block is evaluated by a first set of threads 404 "pca" as true and by a second set of threads 406 "pcb" as false. In this example, there are three threads in the first set of threads (as indicated by mask 410) and five threads in the second set of threads (as indicated by mask 408). In this embodiment, the path with the smallest mask (and thus the smallest amount of threads) is processed first, and the mask representing the remaining amount of threads is pushed onto the stack 412. Pushing the larger mask onto the stack ensures that the number of active bits is reduced by at least 50% for each push. In an embodiment, the program counter is also pushed onto a stack. In this example, the program counter is pointing to "pcb," representing the second set of threads 406.

The second condition 414 is then evaluated, and one thread 416 evaluated the condition as true, while two threads 418 evaluate the condition as false. The thread evaluating the condition as true 416 is processed, and masks and program counters representing the threads evaluating the condition as false 418 are pushed onto the stack 420. After thread 416 is finished executing, threads from the stack 420 are processed. The mask and program counter representing threads 418 are popped (as these were the last to be pushed onto the stack) and are executed. After threads 418 have executed, the mask and program counter representing the next set of threads 406 is popped from the stack and processed.

Another conditional branch 422 is reached as threads 406 are processed. Two threads 424 evaluate condition 422 as true, and three threads 426 evaluate condition 422 as false. Since threads 424 have a smaller mask, they are processed first, and the mask and program counter representing threads 426 are pushed onto the stack. After threads 424 are executed, the mask and program counter representing threads 426 are popped from the stack and processed. After threads 426 have finished executing, all conditional statements in the block have finished processing, and join point 428 is reached.

The above systems and methods may be implemented as a computer program executing on a machine, as a computer program product, or as a tangible and/or non-transitory computer-readable medium having stored instructions.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method comprising:
    responsive to a determination that a first set of threads evaluate a conditional statement in program code as true and, concurrently, that a second set of threads evaluate the conditional statement as false:
        executing first code associated with the conditional statement in a smaller set of threads, wherein the smaller set of threads is the smaller of the first set of threads and the second set of threads, and
        executing second code associated with the conditional statement in a larger set of threads upon the smaller set of threads finishing execution of the first code, wherein the larger set of threads is the larger of the first set of threads and the second set of threads.

2. The method of claim 1, wherein the executing of the first code and the second code is performed using a single instruction multiple data (SIMD) processing core.

3. The method of claim 1, further comprising:
    responsive to the determination that the first set of threads evaluate the conditional statement as true and that the second set of threads evaluate the conditional statement as false, storing an identifier associated with the larger set of threads, wherein the identifier indicates which threads evaluate the condition as true and which threads evaluate the condition as false.

4. The method of claim 3, further comprising storing the identifier in a set of registers, wherein a number of the registers is equal to $\log_2(N)$, and wherein N represents a sum of the first set of threads and the second set of threads.

5. The method of claim 1, wherein the identifier is a mask, and wherein the method further comprises:
    responsive to the determination that the first set of threads evaluate the conditional statement as true and that the second set of threads evaluate the conditional statement as false, storing a program counter associated with the larger set of threads.

6. The method of claim 1, further comprising:
    parsing the program code prior to executing the first code and the second code;
    inserting a fork instruction into the program code before the conditional statement; and
    inserting a join instruction into the program code after the conditional statement.

7. The method of claim 6, further comprising:
    using a compiler to parse the program code and to insert the fork instruction and the join instruction into the program code.

8. A method comprising:
    identifying a first set of threads that evaluate a condition of a conditional statement in program code as true and a second set of threads that evaluate, concurrently, the condition as false; and
    responsive to a determination that a first number of threads in the first set of threads is greater than a second number of threads in the second set of threads:
        executing first code associated with the second set of threads, and
        executing second code associated with the first set of threads upon the second set of threads finishing execution of the first code.

9. The method of claim 8, wherein the first code and the second code are executed using a single instruction multiple data (SIMD) processing core.

10. The method of claim 8, further comprising:
    parsing the program code prior to identifying the first set of threads and the second set of threads;
    inserting a fork instruction into the program code before the conditional statement; and
    inserting a join instruction into the program code after the conditional statement.

11. The method of claim 8, further comprising storing an identifier associated with the first set of threads.

12. The method of claim 11, wherein the identifier is a mask, wherein the identifier is stored by pushing it onto a first stack, and wherein the method further comprises pushing a program counter associated with the first set of threads onto a second stack.

13. An article of manufacture including a non-transitory computer-readable medium having instructions stored thereon, execution of which by a processing device causes the processing device to perform operations comprising:
    identifying a first set of threads that evaluate a condition of a conditional statement in program code as true and a second set of threads that evaluate, concurrently, the condition as false; and
    responsive to a determination that a first number of threads in the first set of threads is greater than a second number of threads in the second set of threads:
        executing first code associated with the second set of threads, and
        executing second code associated with the first set of threads upon the second set of threads finishing execution of the first code.

14. The article of manufacture of claim 13, wherein the first code and the second code are executed using a single instruction multiple data (SIMD) processing core.

15. The article of manufacture of claim 13, wherein the processing device is further configured to perform operations comprising:
    pushing a mask associated with the first set of threads onto a first stack; and
    pushing a program counter associated with the first set of threads onto a second stack.

16. The article of manufacture of claim 13, wherein the processing device is further configured to perform operations comprising:
- parsing the program code prior to identifying the first set of threads and the second set of threads;
- inserting a fork instruction into the program code before the conditional statement; and
- inserting a join instruction into the program code after the conditional statement.

17. A system comprising:
- a processor; and
- a memory storing instructions, execution of which by the processor causes the processor to perform operations comprising:
  - identifying a first set of threads that evaluate a condition of a conditional statement in program code as true and a second set of threads that evaluate, concurrently, the condition as false, and
  - responsive to a determination that a first number of threads in the first set of threads is greater than a second number of threads in the second set of threads:
    - executing first code associated with the second set of threads, and
    - executing second code associated with the first set of threads upon the second set of threads finishing execution of the first code.

18. The system of claim 17, wherein the processor is a (SIMD) processing core.

19. The system of claim 17, wherein the processor is further configured to perform operations comprising:
- pushing a mask associated with the first set of threads onto a first stack; and
- pushing a program counter associated with the first set of threads onto a second stack.

20. The system of claim 17, wherein the processor is further configured to perform operations comprising:
- parsing the program code prior to identifying the first set of threads and the second set of threads;
- inserting a fork instruction into the program code before the conditional statement; and
- inserting a join instruction into the program code after the conditional statement.

* * * * *